G. K. COOKE.
Making Rubber Stereotypes.
No. 138,006.  Patented April 22, 1873.
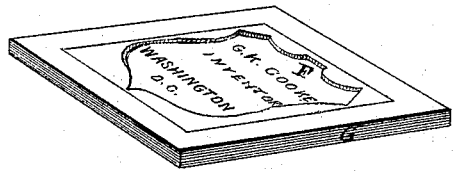
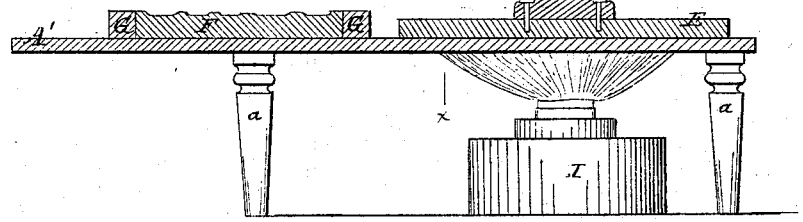
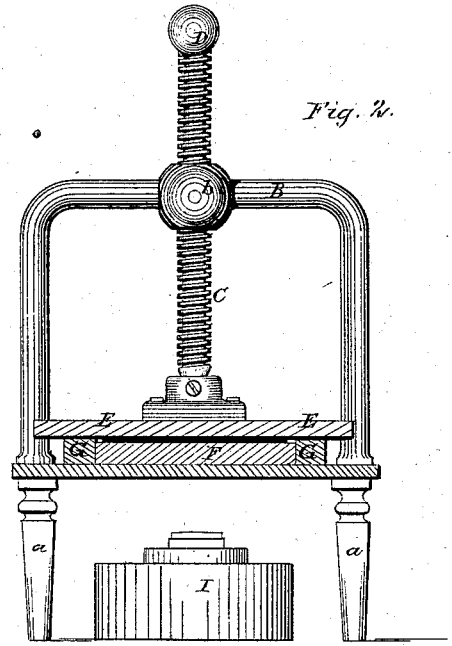
Witnesses.
C. H. Foole
John R. Young
Inventor.
Geo. K. Cooke,
By Prindle and Co.
His Attorneys.
AM. PHOTO-LITHOGRAPHIC CO. N.Y. (OSBORNES PROCESS.)

UNITED STATES PATENT OFFICE.

GEORGE K. COOKE, OF NEW YORK, N. Y.

IMPROVEMENT IN MAKING RUBBER STEREOTYPES.

Specification forming part of Letters Patent No. 138,006, dated April 22, 1873; application filed September 2, 1872.

*To all whom it may concern:*

Be it known that I, GEORGE K. COOKE, of New York, in the county of New York and in the State of New York, have invented certain new and useful Improvements in Making Rubber Stereotypes; and do hereby declare that the following is a full, clear, and exact description thereof, reference being had to the accompanying drawing making part of this specification, in which—

Figure 1 is a central longitudinal section of my apparatus. Fig. 2 is a cross-section of the same on line $x\,x$ of Fig. 1, having the mold and rubber sheet in position; and Fig. 3 is a perspective view of the mold detached.

Letters of like name and kind refer to like parts in each figure.

My invention is an improved method of producing flexible forms for printing, by means of the press hereinafter described, adapted for the application to it of dry heat, substantially as specified.

In the annexed drawing, A represents the bed, the same being extended longitudinally for the purpose of forming a table or shelf, A', on which the form or mold is placed to dry after the impression is made, and while the press is being heated. Said bed is provided with four legs, $a$, as shown in the drawing, so as to permit of a lamp, I, being placed under it for the purpose of heating the press. B is the frame, having a spherical enlargement, $b$, in the center, through which is a vertical opening provided with a screw-thread, through which passes the screw C, to the top of which is attached a hand lever or wheel, D, the lower end of said screw being pivoted to the platen E. F represents the mold, formed of plaster of Paris, or other suitable plastic material; and G, a metal rim or chase within which said mold is confined. H is the sheet of rubber upon which the impression is to be taken, in relief.

My apparatus is now complete, the operation of which is as follows: I first form the mold of plaster, and take the impression in the way the stereotype-molds are usually made, after which it is placed on the table A' to dry. The platen E is now screwed down until it rests on the bed A, under which is placed the lamp I for the purpose of heating the press, after accomplishing which a piece of suitable size is cut from a sheet of soft vulcanized rubber, which is laid upon the face of the mold, and the latter placed under the platen, between which and the rubber is inserted a piece of paper. The platen E is now screwed down, forcing the rubber into all the cavities of the matrix, producing a sharp and accurate impression in relief. After remaining within the heated press a suitable time, say, ten minutes, the rubber type or form will be perfectly and permanently formed, and may, after cooling, be removed from the mold and attached to a block of wood, of any suitable form, ready for use.

The entire press and the chase G are constructed preferably of brass, to enable them to be heated more readily and uniformly.

Having thus fully set forth the nature and merits of my invention, what I claim as new is—

The process, hereinbefore described, for producing flexible printing-forms from vulcanized-rubber composition by the combined agency of dry heat and pressure, applied substantially as specified.

In testimony that I claim the foregoing I have hereunto set my hand this 31st day of August, 1872.

GEORGE K. COOKE.

Witnesses:
JOHN R. YOUNG,
EDM. F. BROWN.